March 17, 1964  E. C. CLARK ETAL  3,124,865
TOOL HOLDERS

Filed Dec. 15, 1960  2 Sheets-Sheet 1

INVENTORS
Earl C. Clark &
BY Herley J. Harless

R. P. Bernard
ATTORNEY

March 17, 1964 E. C. CLARK ETAL 3,124,865
TOOL HOLDERS
Filed Dec. 15, 1960 2 Sheets-Sheet 2

INVENTORS
Earl C. Clark &
BY Herley J. Harless

ATTORNEY

United States Patent Office

3,124,865
Patented Mar. 17, 1964

1

3,124,865
TOOL HOLDERS
Earl C. Clark, Ingalls, and Herley J. Harless, North Drive, Ind., assignors to General Motors Corporation, Detroit, Mich., a corporation of Delaware
Filed Dec. 15, 1960, Ser. No. 75,951
2 Claims. (Cl. 29—96)

This invention relates to tool holders and more particularly to an adjustable tool holder for a throwaway-type carbide tool insert.

Many different types of tool inserts are known, and the prior art relating to tool holders for tool inserts is voluminous. A common type of tool insert is the carbide insert. Some carbide inserts are formed with an elongated body having rectangular, triangular or circular cross sectional configurations as shown in U.S. Patent 2,659,962. Other carbide inserts are formed as rectangular blocks as shown in U.S. Patents 2,623,272, 2,675,604 and 2,716,800. The aforementioned carbide inserts are used in a common manner, in that, one side surface of the insert is used to form a cutting edge or edges and is reground and redressed when the cutting edge or edges become worn until the insert is substantially consumed. In order to accommodate the change in length of the carbide inserts as they are reground and redressed, a variety of adjustable tool holders have been devised similar to those disclosed in the aforementioned patents. It is to be noted that there is generally only one dimensional change in the insert as it is consumed, and that known tool holders for this type of insert utilize the other unvarying dimensions of the insert to suitably clamp and support the insert on the tool holder.

Another common type of tool insert is the throwaway carbide tool insert which has a flat, relatively thin, body. The throwaway-type tool inserts are commonly formed with top and bottom surfaces having square, triangular, or circular shapes. The side surfaces of the square and triangular shaped inserts are equally dimensioned to facilitate indexing of the inserts.

The original purpose of the throwaway-type tool insert was to eliminate the costly process of regrinding and redressing a tool insert after each use. In order to maximize cost savings, the throwaway-type tool inserts are formed in shapes which provide a plurality of cutting edges and which may be indexed on the tool holders to alternately position each cutting edge in cutting position relative to the tool holder. Thus, a triangular shaped insert provides at least three cutting edges and a square insert provides at least four cutting edges. The throwaway-type tool inserts are conventionally manufactured in standard sizes, such as one-quarter, one-half, three quarters and one inch as measured across the top surface thereof. In present practice, the throwaway varbide inserts are generally discarded after all the cutting edges become dull and worn. Previous tool holders for throwaway-type carbide inserts were designed to accommodate only a particular size insert and each tool holder was provided with a tool insert seat dimensioned to receive a particular size throwaway-type tool insert. Accordingly, it was conventional practice to supply a different tool holder for each size of similarly shaped throwaway-type tool inserts. For example, a three-quarter inch insert was used with a tool holder provided with a three-quarter inch

2 insert seat and a one inch insert was used with a tool holder provided with a one inch insert seat.

This invention is directed to an improvement in the conventional method and apparatus for utilizing throwaway-type tool inserts which provides even greater saving in tool costs. By carefully controlling the length of time of use of the throwaway-type tool insert, it has been possible to devise a standard method of regrinding the throwaway-type tool inserts when they become worn by removing equal amounts of material from all side surfaces to maintain the same insert shape. Accordingly, the conventional throwaway-type tool inserts may be reused several times with a resulting savings determined by the difference in cost of a new throwaway-type tool insert and the cost of regrinding an old worn insert. Each time the throwaway-type tool inserts are reground, the basic size of the insert diminishes, and it is possible to reuse a throwaway-carbide insert through several conventional standard sizes. The equilateral shapes of the inserts are maintained by grinding equal amounts of material from each side of the inserts. Thus, an original standard one inch throwaway carbide insert may be reused until it attains the standard size of one-half inch or less. Since the size of the throwaway carbide insert is to be varied by each regrinding operation, the standard size tool holders previously used will not accommodate the irregularly sized reground inserts. In order to utilize the new method of regrinding the throwaway carbide inserts and maximize the savings involved, a new tool holder has been designed which readily accommodates any size throwaway-type insert in an indiscriminate range of sizes below the original standard size of the throwaway-type insert. Previous tool holders for tool inserts which were reground and redressed by repeated grinding of one side surface which resulted in changed insert shapes without variation in all the peripheral dimensions of the insert have been provided with adjustment means to variably position the inserts as they were reduced in size. Since the throwaway-type inserts are worn along all the peripheral side surfaces during use because of indexing, regrinding operations correspondingly reduce the size of the inserts along all the peripheral surfaces thereof. None of the previously known tool holders has been designed to accommodate variations in the size, but not in shape, of throwaway-type inserts.

It is, therefore, an object of this invention to provide an adjustable tool holder to accommodate varying sizes of throwaway-type tool inserts. It is an additional object of this invention to provide a holding device for varying sizes of throwaway-type inserts having an insert seat arranged and constructed to rigidly support a throwaway-type insert regardless of variation in size. Another object of this invention is to provide a tool holder for throwaway-type tool inserts of simple design which is economical to produce and sturdy in use. A further object is to provide a tool holder having substantially equal relative contact between the tool insert engaging surfaces thereof and varying sizes of similarly shaped tool inserts.

Other objects and advantages of this invention are disclosed and inherent in the following detailed description wherein reference is made to the accompanying drawings in which.

Figure 1:
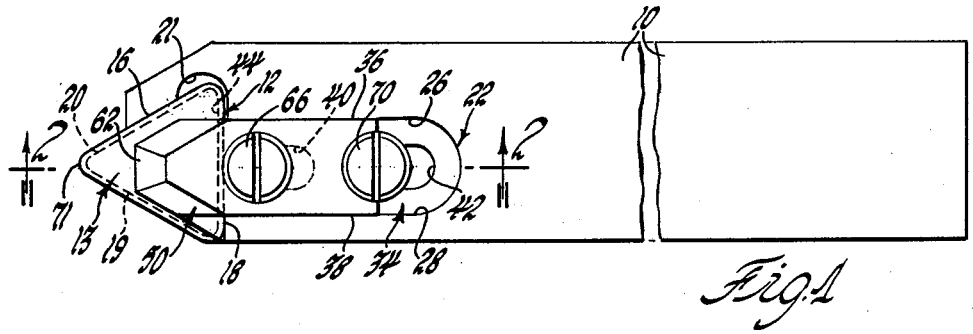
FIGURE 1 is a plan view of an illustrative embodiment of the present invention.
Figure 2:
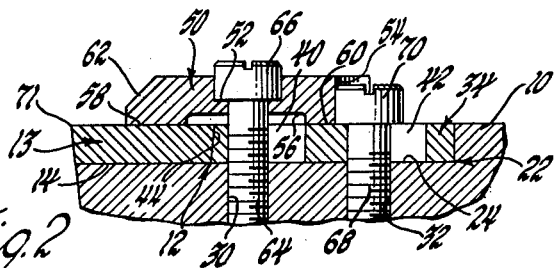
FIGURE 2 is a partial sectional view of the embodiment shown in FIGURE 1 taken along the line 2—2.

Referring to FIGURES 1 and 2 of the drawings, a tool holder for a triangular throwaway-type tool insert embodying the present invention is illustrated. The tool holder comprises an elongated tool holding block 10 having a tool insert seat 12 formed on one end thereof. The insert seat has a generally triangular shape corresponding to the shape of an insert 13 of conventional design having rounded corners and inclined side surfaces to provide a negative rake angle. The insert seat comprises a flat bottom surface 14 which is defined by an upwardly extending side abutment wall 16, a rear upwardly extending wall 18 and downwardly extending intersecting side walls 19, 20. The insert seat bottom surface 14 is approximately dimensionally equal to the maximum size throwaway-type insert to be used with the tool holder. The corner 21 of the insert seat, which is defined by the intersection of the side abutment wall 16 and the rear wall 18, is outwardly recessed to prevent surface engagement with the adjacent cutting edge of a tool insert mounted on the tool insert seat and to permit adjustment of the tool insert as it is reground to progressively smaller sizes in a manner hereinafter described. A slideway groove 22 formed in the top surface of the tool holding block intersects the rear abutment wall 18 of the tool insert seat 12 and extends rearwardly therefrom at substantially right angles thereto. The groove 22 provides a guideway which is defined by a substantially flat bottom surface 24 and spaced parallel side walls 26, 28. Suitable fastener receiving means, such as spaced threaded holes 30, 32 extend into the tool holding block 10 within the slideway groove 22.

A slide member 34 having a substantially flat bottom surface and spaced parallel side walls 36, 38 is slidably supported within the guideway provided by groove 22. The side walls 36, 38 of the slide 34 are spaced approximately the same distance as the side walls 26, 28 of the guideway 22 so that only enough clearance is provided to permit sliding movement of the slide within the guideway and to enable the side walls 26, 28 of the guideway to provide lateral support to the side walls 36, 38 of the slide 34. A pair of spaced elongated slots 40, 42 are provided in the slide 34 and are spaced from one another to simultaneously overlie the spaced threaded holes 30, 32. The length of the slots 40, 42 is sufficient to permit slidable adjustment of the slide 34 throughout a range of movement equal to the distance through which the throwaway-type insert must be adjusted to move the cutting edges thereof into cutting position as the insert is progressively reduced in size. The direction of movement of the slide relative to the insert seat is substantially along a path defined by a line drawn through the intersection of the plane of the upwardly extending side abutment wall 16 and the downwardly extending side wall 19 at right angles to the rear upwardly extending wall 18. An insert abutment surface 44 is provided on the front end of the slide 34. The abutment surface is contoured to provide full surface engagement with one side surface of the tool insert. The upwardly rearwardly inclined surface illustrated accommodates the inclined side surfaces of the triangular insert 13. The abutment wall 16 is also similarly inclined to correspond to the side surfaces of the insert 13. The side walls 16, 19 define planes which intersect at substantially 60° and each of the planes defined by the side walls 16, 19 intersect the plane defined by the abutment surface 44 of the slide at substantially 60°. Clamping means for securing the insert on the bottom surface are provided and comprise a clamping plate 50 having a pair of spaced fastener receiving openings 52, 54. The fastener receiving openings 52, 54 and the threaded holes 30, 32 are identically spaced. A central transverse slot 56 divides the clamping plate 50 into front and rear abutment portions 58, 60. The front fastener receiving opening 52 is centrally located relative to the transverse slot 56 and the clamping force for securing the insert in place is exerted above the slot 56 to produce a flexed clamping engagement between the front abutment portion 58 and the tool insert. The rear fastener receiving opening 54 serves as a locating seat or abutment to prevent pivotal movement of the clamping plate relative to fastener receiving opening 52 and may be in the form of a cylindrical bore or a rearwardly extending slot. The upper surface 62 of the front end of the clamping plate 50 is rearwardly inclined at a suitable angle and configuration to serve a chip breaking function. A threaded fastening member 64 having a cylindrical head 66 is mounted in the fastener receiving opening 52 and extends through the slot 40 to be threadably received in the threaded hole 30. A threaded fastening member 68 having a cylindrical head 70 is received within the opening 54 and extends through the slot 42 to be threadably received in the threaded hole 32.

As shown, the triangular insert 13 is secured on the tool insert seat 12 by the clamping plate 50 with two side surfaces thereof in abutting engagement with the side wall 16 and the abutment surface 44 on the end of the slide 34. A cutting edge 71 of the insert is positioned outwardly beyond the bottom surface 14 a sufficient distance to contact a workpiece in a predetermined manner. The bottom surface 14 and the bottom surface of the guideway may be inclined to provide any desired angular relationship of the insert relative to the tool holder and the side surfaces of the insert and the abutment walls therefor may also be inclined to provide any desired rake angle or clearance angle. Regardless of variations in the size of the throwaway-type insert as it is redressed and reground, the contact area of the insert with the surrounding support surfaces remains substantially constant. The size of the insert seat is substantially correspondingly reduced as the size of the insert is reduced by adjustment of the slide 34 outwardly over the bottom surface 14 of the tool insert seat 12. The path of movement of the slide relative to the bottom surface 14 maintains the same angular relationship between the abutment surface 44 and the side walls 16, 19, and defines a substantially similarly shaped seat at each position of adjustment. In this manner, the relative area of surface engagement between varying sizes of similarly shaped tool inserts and the tool seat remains substantially constant.

Figure 3:
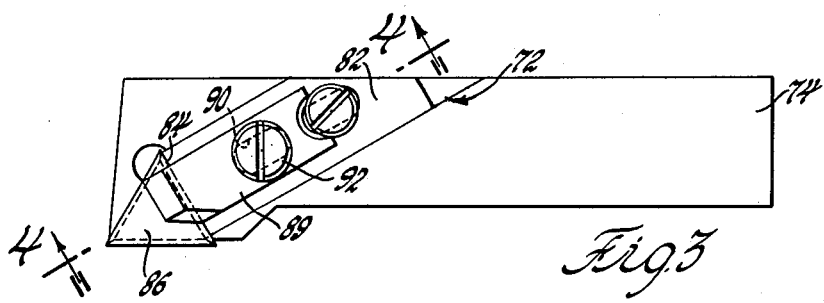
FIGURE 3 is a plan view of another illustrative embodiment of the present invention.
Figure 4:
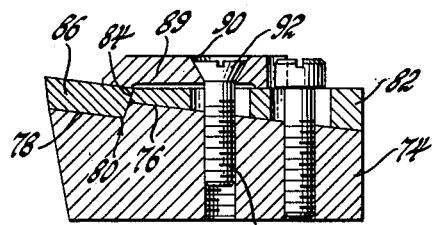
FIGURE 4 is a partial sectional view of the embodiment shown in FIGURE 3 taken along the line 4—4.

An alternative embodiment of the aforedescribed tool holder is shown in FIGURES 3 and 4; and differs in construction, in that, the slideway groove 72 is canted relative to the longitudinal axis of the tool holding block 74. In addition, the bottom surface 76 of the groove and the bottom surface 78 of the insert seat 80 are downwardly and rearwardly inclined to obtain a predetermined cutting angle. The bottom surface of the slide plate 82 is correspondingly inclined, so that the front abutment surface 84 has full surface engagement with the adjacent side wall of the throwaway-type insert 86. A preferred fastener arrangement is shown and comprises a front opening in the clamping plate 89 defined by an upwardly outwardly sloping conical surface 90 which seats a conical head 92 of a threaded fastening member 94. In this manner, a more secure clamping engagement is obtained. The operation of the tool holder is the same as the operation of the previously described embodiment. It should be obvious that other similar changes in the location and arrangement of the parts may be provided to obtain any desired cutting angle or approach angle.

Figure 5:
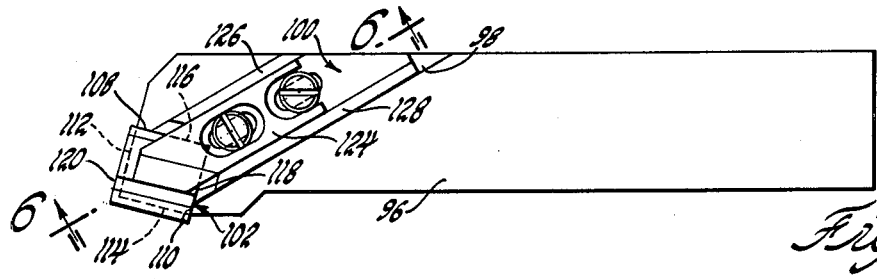
FIGURE 5 is a plan view of still another illustrative embodiment of the present invention.
Figure 6:
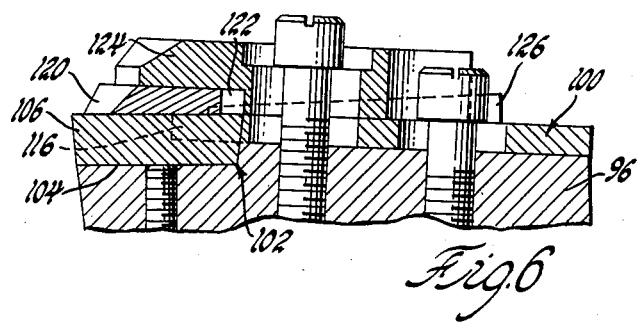
FIGURE 6 is an enlarged partial sectional view of the embodiment shown in FIGURE 5 taken along the line 6—6.

Referring now to FIGURES 5 and 6, a tool holder for a square throw-away-type insert embodying the present invention is illustrated. A tool holding block 96 is provided with a slideway groove 98 which is canted at an angle relative to the longitudinal axis of the block. A slide 100 is slidably mounted in the slideway groove 98 as hereinbefore described. The front of the slideway groove intersects an insert seat 102 comprising a bottom surface 104 having a substantially square shape corresponding to a square tool insert 106 and which is recessed relative to the bottom surface of the slideway groove as shown in FIGURE 6. The bottom surface 104 of the insert seat 102 is defined by upwardly extending side walls 108, 110 and intersecting downwardly extending side walls 112, 114. The front end of the slide is provided with inwardly, rearwardly extending side walls 116, 118 which intersect at right angles to provide an abutment surface for two of the side walls of the insert 106. The height of the portions of the side walls 108, 110 which intersect the guideway 98 is substantially less than the height of the side walls of the insert so that the side walls 116, 118 of the slide have full surface engagement with the adjacent side walls of the insert. The portion of the bottom surface 104 which engages the tool insert is defined by the side abutment walls 116, 118 of the slide and the downwardly extending side walls 112, 114 of the tool holding block 96. The side walls 112, 114 intersect at substantially right angles so that a substantially square shaped seat is defined on the bottom surface by the abutment walls 116, 118 of the slide. The path of movement of the slide relative to the bottom surface 104 is substantially along a line extending between the intersection of the abutment walls 116, 118 and the downwardly extending side walls 112, 114 so that a substantially square shaped seat is defined at all positions of adjustment of the slide. The range of adjustment may be varied as desired for particular applications by alternately utilizing a plurality of slide plates having varying length slots. In this manner, the relative contact area between varying sizes of square shaped tool inserts and the bottom surface 104 and the abutment walls 116, 118 remains substantially constant. In some cases, a chip breaker insert 120 may be mounted on the throwaway-type insert and seated within a recess 122 provided on the end of a clamping plate 124. The insert and chip breaker are secured in position as hereinbefore described by the clamping plate which is slidably positioned between parallel upwardly extending side walls 126, 128 of the slide 100 and is abuttingly retained therebetween to provide additional rigidity to the assembly.

Figure 7:
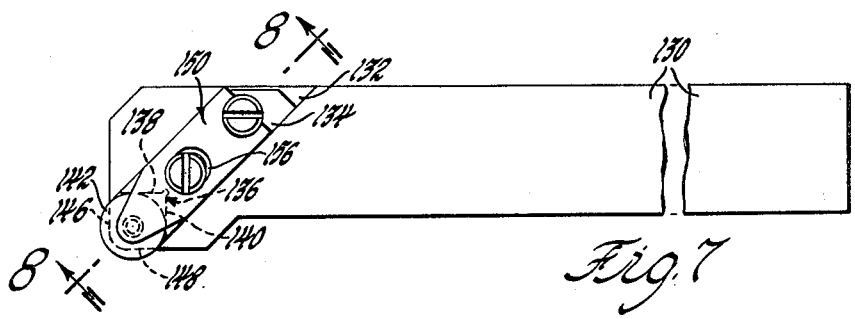
FIGURE 7 is a plan view of a further embodiment of the present invention.
Figure 8:
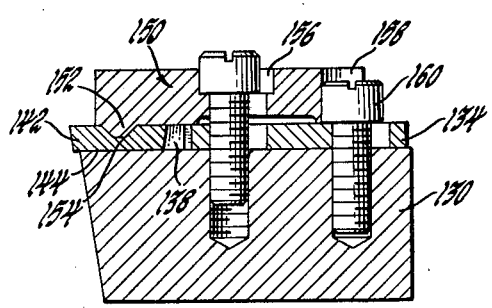
FIGURE 8 is an enlarged partial sectional view of the embodiment shown in FIGURE 7 taken along the line 8—8.

Referring now to FIGURES 7 and 8, a tool holder for a circular throwaway-type insert is illustrated. A tool holding block 130 is provided with a slideway groove 132 which is canted relative to the longitudinal axis thereof. A slide 134 having a front abutment surface 136 formed by inwardly, rearwardly extending side surfaces 138, 140 which intersect at right angles is slidably mounted in the groove. As shown, a circular insert 142 has substantially point contact with each of the side surfaces 138, 140 and may be adjustably positioned thereby on a bottom insert seat surface 144 which is defined by intersecting downwardly extending side walls 146, 148 and the upwardly extending side surfaces 138, 140. The side walls 146, 148 intersect at right angles to define a substantially square shaped bottom surface 144. The path of movement of the slide 134 is substantially along a line drawn between the intersection of the side walls 146, 148 and the intersection of the side surface 138, 140 to provide a bottom surface of varying size and substantially constant shape. A modified clamping plate 150 is provided with a depending conical abutment 152 on the front clamping portion thereof which is adapted to be received within a conical opening 154 provided on the top surface of the circular insert. Since the clamping plate 160 must be adjusted as the insert is variably positioned to retain the abutment 152 in the opening 154, an elonagted slot 156 is provided as the front fastener receiving opening and the rear fastener receiving opening 158 is elongated to maintain engagement with the rear fastening member 160 at all adjusted positions. The operation of the circular-type tool holder is identical to the aforedescribed tool holders, and a substantially constant surface engagement relationship between varying sizes of the circular insert and the bottom surface of the seat and the abutment surface of the slide is maintained.

Other modifications of the details of construction and the arrangement of the various parts is intended to be included within the scope of this invention, except insofar as limited by the prior art.

The invention claimed is:

1. A tool holder adapted to mount throwaway-type inserts characterized by becoming worn in service and being rendered capable of repeated use by regrinding operations thus altering the standard basic size, said tool holder comprising a block portion having a slide receiving channel formed therein, an adjustable insert seat having a bottom portion joined by wall portions formed in one end of said block, said channel connecting with said seat at a wall portion thereof, a slidable member received in said channel and being extendable into said seat area, the end of said slidable member forming a movable wall portion of said seat and cooperating with the other wall portions thereof by moving relative thereto to change the insert seat area to form an adjustable insert pocket accommodating a reground throwaway insert, clamping means aligned with said slidable member and adapted for movement relative thereto, a fore portion of said clamping means extending above said insert seat and located for clamping engagement with a throwaway-type insert seated thereon and an aft portion extending above said slidable member for clamping engagement therewith, first fastener means for securing the clamping means being anchorable to the block intermediate said fore and aft portions, and second fastener means anchorable to the block rearwardly of the first fastener means and being engageable with the aft portion of the clamping means to maintain the alignment thereof with the slidable member and insert seat, the second fastener means cooperating with said aft portion for securing only the slidable member to the block independently of said first fastener means thus serving the dual function of holding the position of the slidable member while maintaining the alignment of the clamping means whereby the first fastener means may be released without affecting the setting of said slidable member.

2. A tool holder adapted to mount throwaway-type inserts characterized by becoming worn in service and being rendered capable of repeated use by regrinding operations thus altering the standard basic size, said tool holder comprising a block portion having a slide receiving channel formed therein, an adjustable insert seat having a bottom portion joined by wall portions formed in one end of said block, said channel connecting with said seat at a wall portion thereof, a slidable member received in said channel and being extendable into said seat area, the end of said slidable member forming a movable wall portion of said seat and cooperating with the other wall portions thereof by moving obliquely relative thereto to change the insert seat area to form an adjustable insert pocket accommodating a reground throwaway insert, clamping means aligned with said slidable member and adapted for movement relative thereto, a fore portion of said clamping means extending above said insert seat and located for clamping engagement with a throwaway-type insert seated thereon and an aft portion extending above said slidable member for clamping engagement therewith, first fastener means extending through the clamping means and slidable member being anchorable in the block intermediate said fore and aft portions, and second fastener means extending through the slidable member being anchorable in the block rearwardly of said clamping means but cooperating with said aft portion to maintain the alignment of the clamping means with the slidable member and insert seat, the second fastener means securing the slidable member to the block independently of said first fastener means serving the dual function of holding the position of the slidable member while maintaining the alignment of the clamping means whereby the first fastener means may be released without affecting the setting of said slidable member.

References Cited in the file of this patent

UNITED STATES PATENTS

| | | |
|---|---|---|
| 2,805,467 | Greenleaf | Sept. 10, 1957 |
| 2,808,637 | Hudson | Oct. 8, 1957 |
| 2,936,679 | Thuerwachter | May 17, 1960 |

FOREIGN PATENTS

| | | |
|---|---|---|
| 215,113 | Australia | Apr. 1, 1958 |
| 428,789 | Great Britain | May 20, 1935 |
| 810,197 | Great Britain | Mar. 11, 1959 |
| 817,002 | Great Britain | July 22, 1959 |
| 818,262 | Great Britain | Aug. 12, 1959 |
| 868,012 | Great Britain | May 17, 1961 |
| 1,164,677 | France | May 19, 1958 |